United States Patent [19]
Chapman

[11] Patent Number: 5,609,108
[45] Date of Patent: Mar. 11, 1997

[54] TRACK WHEEL KINGPIN SYSTEM FOR A CAMERA DOLLY

[75] Inventor: Leonard T. Chapman, North Hollywood, Calif.

[73] Assignee: Leonard Studio Equipment, Inc., North Hollywood, Calif.

[21] Appl. No.: 573,379

[22] Filed: Dec. 15, 1995

[51] Int. Cl.$^6$ .................................................. B61F 5/00
[52] U.S. Cl. ..................... 105/170; 105/169; 105/178; 105/215.1; 105/218.1; 295/1; 295/36.1; 295/43
[58] Field of Search ............................... 105/157.1, 169, 105/162, 165, 170, 171, 178, 180, 215.1, 215.2, 218.1, 72.2; 16/18 R, 45, 46; 301/9.1, 9.2, 35.55, 35.63, 111, 112, 114, 128; 295/1, 9.1, 43, 36.1

[56] References Cited

U.S. PATENT DOCUMENTS

| 2,544,924 | 3/1951 | Herold | 105/170 |
|---|---|---|---|
| 3,015,838 | 1/1962 | Ulinski | 105/170 |
| 4,398,469 | 8/1983 | Zelli | 105/170 |
| 4,589,345 | 5/1986 | Fujita | 105/170 |

OTHER PUBLICATIONS

*The Mini–Panther* Brochure from FGV Panther Corporation of America, 4242 Lankershim Blvd., No. Hollywood, CA 91602 (4 pages), no date.
*Fisher Ten Dolly* Brochure from J. L. Fisher Inc., 10918 Burbank Blvd., No. Hollywood, CA 91601 (2 pages), no date.
*Super Peewee & Super Peewee II* Brochure from Leonard Studio Equipment, Inc., 12940 Raymer St., No. Hollywood, CA 91605 (6 pages) [1991].
*The Pedolly* Brochure from Leonard Studio Equipment, Inc., 12940 Raymer St., No. Hollywood, CA 91605 (6 pages) [1994].
*Accessories and Equipment Rental Catalog* from J. L. Fisher Inc., 10918 Burbank Blvd., No. Hollywood, CA 91601 (19 pages), no date.
*Chapman Peewee Handbook* Booklet from Leonard Studio Equipment, Inc. 12940 Raymer, No. Hollywood, CA 91605 (36 pages) [TR 7–5300], no date.
*Hustler Dolly by Chapman* Brochure from Leonard Studio Equipment, Inc., North Hollywood, CA 91605 (1 page/2 sided), 1988.

Primary Examiner—Mark T. Le
Attorney, Agent, or Firm—Lyon & Lyon

[57] ABSTRACT

A camera dolly has a track wheel system including a kingpin pivotally supported on a dolly chassis. A kingpin tube extends laterally from the kingpin. An axle is pivotally supported within the tube on pins. A track wheel around a bearing is supported on a bushing on the axle. A knob unit threaded into the axle may be turned into a locked position wherein the track wheel is supported as in a conventional axle. For use on curved track, the knob unit is released or backed out, allowing the track wheel to shift laterally, to accommodate moving on curved dolly track, and to allow the wheel to steer on the track at a proper steering angle, by pivoting on the pins.

14 Claims, 3 Drawing Sheets

TRACK WHEEL KINGPIN SYSTEM FOR A CAMERA DOLLY

BACKGROUND OF THE INVENTION

The field of the invention is camera dollies.

Camera dollies are used in the television and motion picture industries to support and maneuver a camera. Typically, the camera dolly is on wheels and has an arm to raise and lower the camera. The camera dolly is generally moved by dolly operators or "grips", to properly position the camera to follow the film or video sequence.

The camera dolly must support and maneuver the camera with a minimum of vibration or shock, to avoid degrading the filmed image quality. Consequently, camera dollies must be designed, manufactured and maintained with precision. When used on a relatively smooth surface, such as studio floor, the camera dolly is generally supplied with pneumatic tires, so that the camera may be smoothly supported and moved, even over minor cracks or bumps in the floor surface.

When the supporting ground surface is bumpy and irregular (e.g., when the dolly is used outdoors on sand, irregular ground, a poor quality paved surface, etc.,) track is assembled on the ground to provide a smooth rolling surface for the dolly. However, for use on track, many dollies require that the pneumatic ground wheels be replaced with stiffer track wheels. Other camera dollies require the installation of track wheel attachments, which are provided as accessories to the dolly. While these techniques have met with varying degrees of success, they have certain disadvantages. For example, it may be time consuming and labor intensive to install track wheels. During production of a motion picture or television program, even a delay of e.g., five minutes, (to install track wheels) can be very costly as all of the actors, camera operators, lighting, sound and special effects professionals, the director and the various crew members must wait until the camera dolly is set up for the track filming sequence. Accordingly, it is advantageous to have equipment which can be quickly set up for the desired film or video sequence. In addition, track wheels or track wheel attachments must be shipped and stored separately from the camera dolly, since they are not permanently attached to the dolly. This requirement further complicates the logistics of television and film production.

Where a camera dolly is moved over curved track, the lateral spacing between the left and right wheels (or sets of wheels) must be allowed to change slightly, to accommodate the wheel position geometry on curved track. In addition, the wheel (or wheel sets) on the inside of the curve must be turned or angled more sharply than the outside wheels. These requirements must be accommodated for good dolly performance, and they complicate dolly design considerations.

Accordingly, there is a need for an improved track wheel system for a camera dolly.

Other and further objects and advantages of the invention will become apparent hereinafter.

SUMMARY OF THE INVENTION

To these ends, a camera dolly includes a chassis and kingpin pivotably supported on the chassis. Preferably, a kingpin tube extends laterally from the kingpin. An axle is advantageously supported within the kingpin tube. A bearing supporting a track wheel is provided on the axle. A knob unit is advantageously threaded into the axle. A bushing or linear bearing may be provided in between the axle and wheel bearing. The track wheel system allows the camera dolly to roll on straight and curved track, without changing wheels, and without the need for separate track wheels or track wheel accessories.

BRIEF DESCRIPTION OF THE DRAWINGS

In the drawings, wherein similar reference characters denote similar elements throughout the several views.

DETAILED DESCRIPTION OF THE PREFERRED EMBODIMENT

Figure 1:
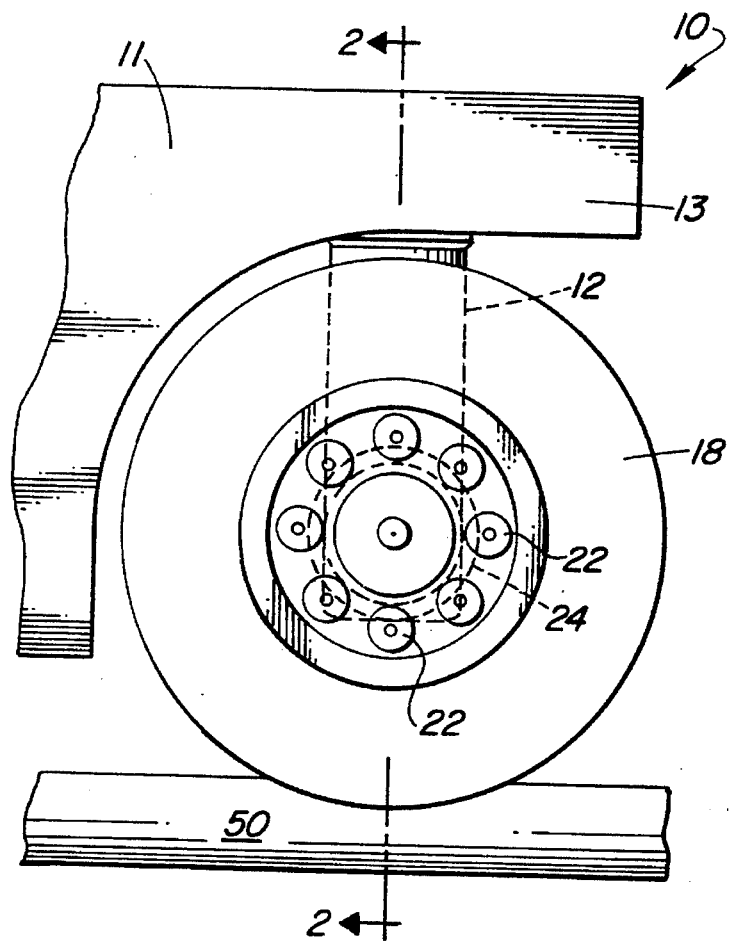
FIG. 1 is a side elevation view of the present track wheel system on a camera dolly.

Turning now in detail to the drawings, as shown in FIG. 1, a camera dolly 10 has a frame 11, with a kingpin 12 pivotally attached to a frame extension 13 integral with the frame 11. The camera dolly 10 illustrated, in a preferred embodiment, is a HUSTLER® dolly, manufactured by Chapman Studio Equipment, Inc., North Hollywood, Calif., although the present track wheel system may be used on various other camera dollies as well.

Figure 2:
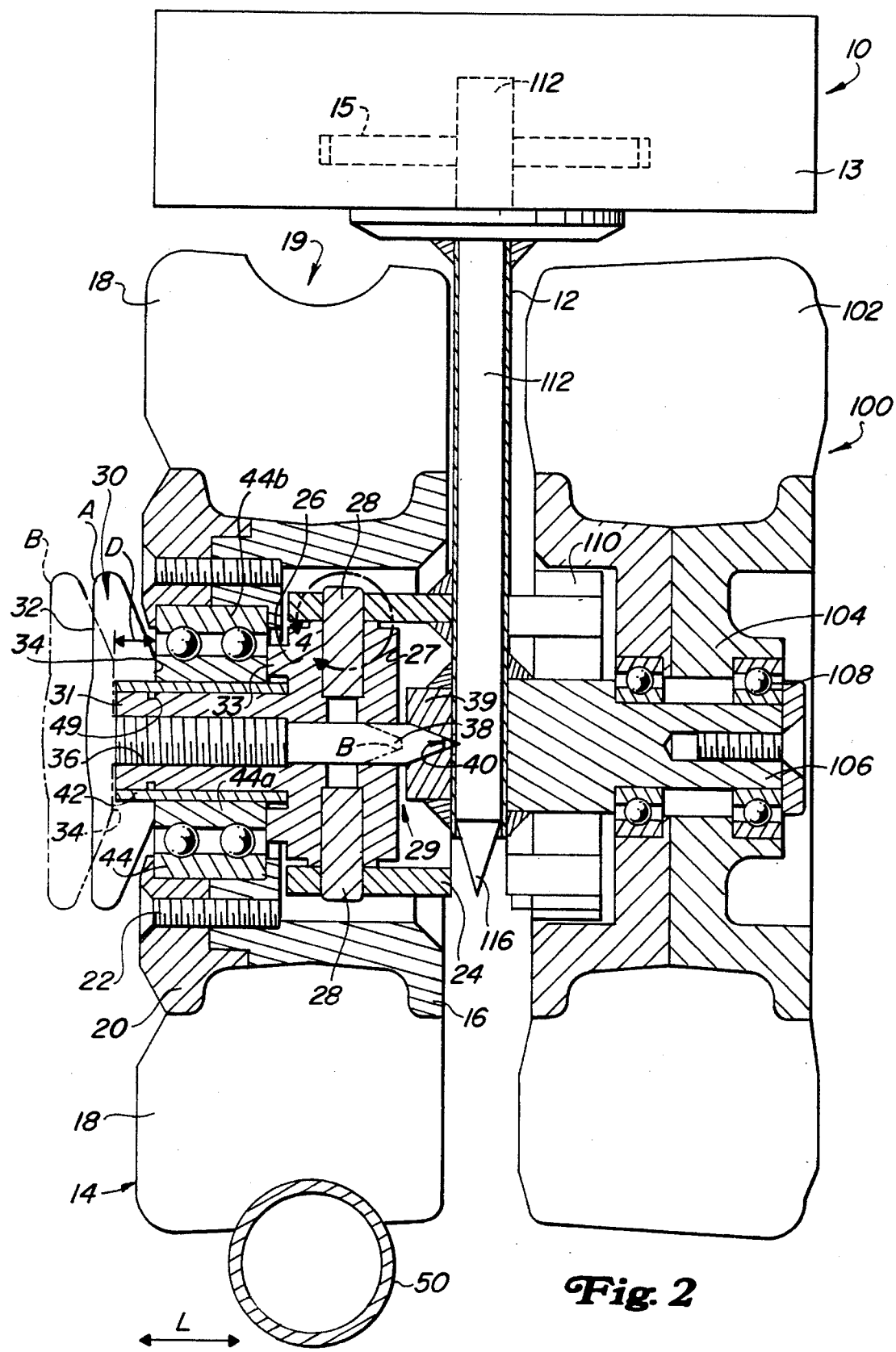
FIG. 2 is a section view thereof taken along line 2—2 of FIG. 1.

Turning to FIG. 2, the kingpin 12 extends upwardly into the frame extension 13 and is linked to sprockets 15 and chains or belts forming part of the steering system of the camera dolly. For use on the ground, the steering system, which is linked to the kingpins at each of the four corners of the camera dolly, steers the dolly in a crab steering mode; or a corrective steering angle steering mode; or in a round steering mode (in certain dollies), as is well known in the art. When used on track, the track itself guides or steers the wheels, and the steering system is inactive and may be disengaged from the wheels.

Figure 3:
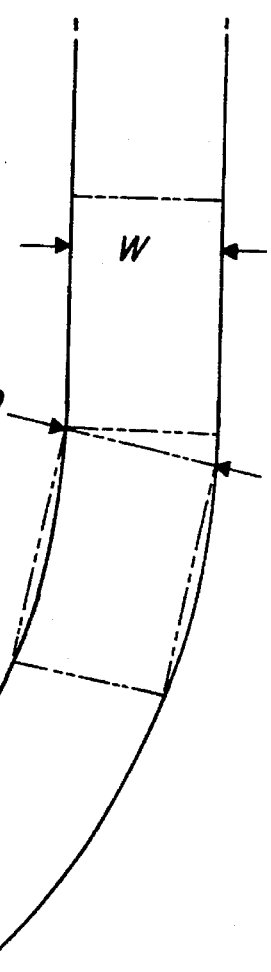
FIG. 3 is a geometric construction illustrating lateral wheel displacement on curved track.

FIG. 3 is a 1/10 scale drawing which illustrates how the lateral distance or width W between left and right kingpin centers must increase as the dolly moves onto curved track. The corners represent kingpin positions. For track having an 8 foot radius (measured at the centerline of the inner rail, the required lateral shift or increase D in the distance between kingpin centers is 0.39 inches (for a Hustler dolly wheelbase). For more sharply curved track, D must be even greater. Without allowing for the increase from W to W+D, the wheels will bind or wedge on the curved track. With camera dollies having wheels on articulated legs, such as the SUPER PEEWEE® dolly or HYBRID dolly, (both manufactured by Chapman Studio Equipment, Inc.) the legs are released and swing freely when on track, to accommodate the curved track geometry. With dollies without articulated legs, like the HUSTLER® dolly, this technique is not available.

Figure 4:
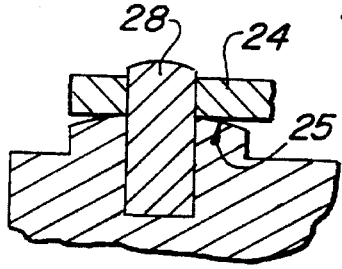
FIG. 4 is an enlarged fragment view of the axle spherical surface shown in FIG. 2.

Referring still to FIG. 2, a kingpin tube 24 is attached, preferably welded, to one of the broad flat sides of the kingpin 12. The kingpin tube 24 is preferably round, although other cross section shapes may be used. An axle 26 is supported within the cylindrical hollow space of the kingpin tube 24 by axle pins 28. The axle pins 28 are securely pressed into the axle 26, from the top and the bottom, and pass through holes in the kingpin tube 24 with a minimum of clearance. Needle bearings may be provided on the pins to reduce pivoting friction. As shown in FIG. 4, the axle 26 preferably has a slightly spherical surface 25 which contacts the inner surface of the kingpin tube 24.

The flat round inside surface 27 of the axle 26 is spaced apart slightly from a block 39 attached to the kingpin 12, leaving a small gap 29 therebetween. A hardened tapered receiving hole 40 is formed within the block 39. A DU bushing 42, or more preferably a linear ball bearing, or equivalent, is installed over a shaft section 31 of the axle 26. A wheel bearing 44 has an inner race 44a pressed on or secured over the bushing 42. An inner wheel hub 16 and an outer wheel hub 20 are secured to the outer race 44b of the bearing 44 via clamping provided by hub bolts 22. A relatively hard e.g., rubber, urethane, etc. track tire 18 is secured and supported by and on the inner and outer hubs 16 and 20. The tire 18 has a groove 19 adapted to match the radius of the round track 50. The groove 19 may also be shaped to fit square track.

A knob assembly 30 has a handle 32, and an externally threaded section 36 engaging internal threads within the shaft section 31 of the axle 26. The knob assembly 30 also has a tapered point 38, having a taper configured to engage and lock into the taper of the hardened receiving hole 40. Alternatively, a cap screw having a tapered end may be used in place of the knob assembly. The knob assembly 30 provides a stop or lock against both lateral wheel shift and wheel steering angle changes.

The right side of FIG. 2 shows the conventional ground wheel 100 for a camera dolly, specifically for a HUSTLER® camera dolly. The ground wheel 100 includes a pneumatic tire 102 having a split hub 104, axle 106 and bearings 108. The tire air pressure may be adjusted for use on various ground surfaces, as is well known in the art. The pneumatic tire 102 is slightly larger in diameter than the track tire, to provide a softer ride and provide good ground contact in non-track use. However, since the pneumatic wheel is slightly larger and has more vertical deflection, ground contact, ride characteristics, and good braking hold are provided, even at a fixed nominal tire pressure.

Figure 7:
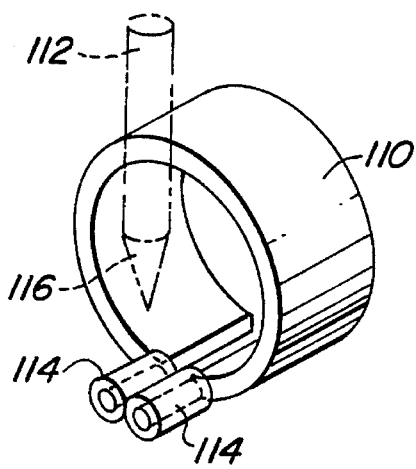
FIG. 7 is a partial perspective view of a ground wheel brake, as is known in the art.

Referring to FIG. 7, the ground wheel 100 has an internal brake shoe 110 which can be actuated by a plunger 112 within the kingpin, via rollers 114. The plunger 112 is mechanically linked to a brake lever at the rear of the dolly, next to the other controls. The plunger 112 is vertically displaceable in a bore in the kingpin 12, to actuate the brake, by urging the split ring brake shoe 110 outwardly against the inside surface of the wheel hub 104. The point 116 on the plunger, when moved downwardly, drives the rollers apart, and expands the split ring brake shoe apart at the bottom. The braking operates only on the ground wheel 100. The split ring brake shoe, as has been used on the HUSTLER® dolly for many years, is preferably aluminum covered with polyurethane, with the polyurethane bearing against the aluminum wheel hub 104 during braking. A thin steel ring can be pressed into the hub 104 to give added hardness on the braking surface.

In use, for rolling movement on ground, the kingpin 12 is rotated (for example, by using the dolly steering system in crab mode) so that the track wheel 14 faces to the inside of the dolly. Accordingly, the handle 32 on the knob assembly 30 does not project beyond the envelope of the dolly frame, when the track wheel system 14 is not in use. In this position, the dolly can be shifted between crab and corrective (conventional) steering. In a preferred embodiment, the pneumatic tire 102 is about 0.12 inch larger in diameter than the track tire 18. The weight of the unloaded dolly (about 400 lbs. for a HUSTLER® dolly) compresses the pneumatic tires to the point where the track wheel rests lightly on the ground, but carries very little weight (when using standard tire air pressure of about 60–85 psi). Since the track (grooved) tire is more rigid (for example a 90 shore hardness polyurethane) than the ground tire 102, it provides added lateral stability or sidewall strength to the dolly. Both wheels may have silicone as an additive, for lubricity to reduce tire noises. With light loads, the ground wheel carries proportionally more weight, as it does not compress enough to allow the track wheel to absorb much of the load. Under heavy loads, the track wheel bears more weight, and provides more support.

For use on standard track, the kingpins 12 (at each of the four corners of the dolly 10) are turned to place the track wheel system 14 to the outside. The knob assembly 30 is in position A, wherein the knob assembly is turned all the way in, and the point 38 is locked into the receiving hole 40 in the block 39 as shown in FIG. 2. In this position, the inner annular surface 34 of the handle 32 clamps the inner race 44a of the bearing 44 against the annular shoulder 33 on the axle 26. Accordingly, with the knob assembly 30 in position A, the tire 18 cannot shift laterally (in the direction L). In addition, with the knob assembly 30 in position A, the axle 26 cannot pivot relative to the kingpin tube 24 and kingpin 12, on its supporting axle pins 28. Hence, with the knob assembly 30 in position A, the track wheel system 14 acts as a conventional wheel support.

However, for use on curved track, the knob assembly 30 is backed out or unthreaded somewhat to position B, thereby releasing the point 38 from the receiving hole 40 (to the position shown in phantom line in FIG. 2). With the knob assembly 30 in position B, and the point 38 released from the receiving hole 40, the axle 26 is free to pivot within the kingpin tube 24 on the axle pins 28. The spherical surface 25 (FIG. 4) better facilitates such pivoting movement. This pivoting movement allows the steering angle of the tire 18 to shift relative to the kingpin 12, to allow the tire 18 to independently follow the curvature of the curved track 50. On an 8 foot radius track, as shown in FIG. 3, the wheel angle is about 11 degrees. In a preferred embodiment, the axle can pivot on the pins 28 plus or minus slightly more than about 18 degrees, which is sufficient to accommodate rolling movement (for a HUSTLER® dolly) over a track having a five foot radius (typically the smallest used in the industry). The range of angular movement of the axle 26 relative to the kingpin 12 is limited by the round outside surfaces of the axle 26 contacting the inner surfaces of the kingpin tube 24 and acting as a stop. The amount of angular movement of the axle 26 relative to the kingpin for any given application, may be calculated based on the wheelbase of the dolly and the curvature of the track.

With the knob assembly 30 in position B, the annular shoulder 34 of the handle 32 is shifted outwardly by dimension D. Accordingly, the inner race 44a of the bearing 44 can then slide in direction L along with the bushing or linear ball bearing 42, thereby increasing the distance between the left and right side track wheels, to accommodate the required increased lateral spacing between the left and right side track wheels, as shown in FIG. 3. The amount of lateral shift available can be set by adjusting the dimension D by turning the handle 32 to the desired position. The sliding lateral movement occurs between the linear ball bearing 42 and the shaft section 31 of the axle 26.

Accordingly, the track wheel system 14 allows the dolly 10 to be used on ground or track, without the need for separate track wheels or attachments. The changeover from ground to track operation is very fast, and may be achieved without using tools.

For use only on straight track, or on ground, the knob assembly 30 is turned in to the "locked" position A.

In general, allowing both the left and right sides at the front or back of the dolly to shift laterally, allows for too much lateral shift. Preferably, only one track wheel system 14 is used at the front, and at the rear of the dolly 10, as it is unnecessary and undesirable to allow the track wheels both the left and the right side of the dolly to shift laterally (in the direction L). Although it is generally preferred on many dollies that lateral wheel movement be achieved only at diagonally opposite corners of the dolly (for improved stability), in the case of the HUSTLER® dolly, such movement is preferred all on one side for ease of set up and use.

Figure 6:
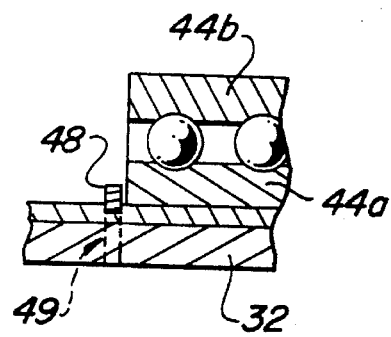
FIG. 6 is an enlarged fragment view showing a retaining ring installed on the system of FIG. 2.
Figure 5:
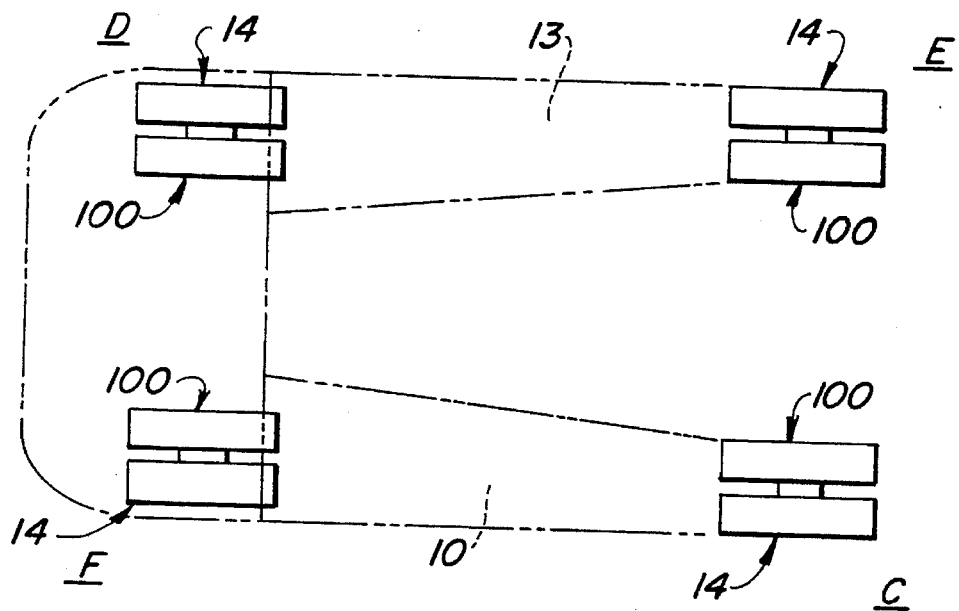
FIG. 5 is a schematic illustration of a camera dolly having the track wheel system of the present invention.

On the other hand, the track steering accommodation provided by allowing the axle 26 to pivot on the pins 28 is desirable at all four corner positions. Accordingly, a retaining ring 48, as best shown in FIG. 6, is installed in a groove 49 in the shaft section 31 of the knob assembly 30, to hold the inner bearing race 44a against any lateral movement, at wheels positions E and D. That is, the systems 14 at positions C and F, in FIG. 5, do not have the retaining ring 48, so that the track wheels 18 at those positions may shift laterally, when the knob assembly 30 is backed out. On the other hand, the track wheel systems 14 at positions E and D in FIG. 5, are provided with the retaining ring 48 to prevent any lateral track wheel movement, while still allowing pivoting steering movement. Thus, lateral movement is available at corners C and F, and pivoting steering track wheel movement is available at all corners C, D, E and F.

Thus, a novel track wheel system has been shown and described. Various modifications may of course be made without departing from the spirit and scope of the invention. The invention, therefore, should not be restricted, except by the intent of the following claims.

I claim:

1. A camera dolly comprising:

a chassis;

a kingpin pivotably supported on the chassis;

a kingpin tube attached to the kingpin;

an axle pivotably attached to the kingpin tube;

a wheel bearing on the axle;

a track wheel attached around the bearing; and a stop attached to the axle.

2. The camera dolly of claim 1 wherein the bearing has an inner race and the stop has a shoulder, and the shoulder bears against the inner race.

3. The camera dolly of claim 1 wherein the stop is a knob unit having a point engageable into a receiving hole on the kingpin.

4. The camera dolly of claim 1 wherein the axle is pivotably attached to kingpin tube with pins.

5. The camera dolly of claim 4 wherein the pins are oriented vertically.

6. The camera dolly of claim 1 further comprising a ground wheel rotatably attached to the kingpin opposite to the track wheel.

7. The camera dolly of claim 1 further comprising a linear ball bearing between the axle and the wheel bearing.

8. A camera dolly comprising:

a chassis;

a kingpin pivotably attached to the chassis;

an axle supported by the kingpin;

a track wheel rotatably attached to the axle;

shift means for allowing the track wheel to shift laterally on the axle; and pivot means for allowing the axle to pivot relative to the kingpin.

9. In a camera dolly having a frame, a kingpin pivotably attached to the frame, and a wheel rotatably positioned on an axle, the improvement comprising:

a kingpin tube joined to the kingpin;

an axle supported within the kingpin tube on axle pins;

a low friction element on the axle;

a bearing around the low friction surface;

a wheel around the bearing; and a knob unit threaded into the axle.

10. The camera dolly of claim 9 wherein the camera dolly has a frame extension integral with the frame, and the kingpin is attached to the frame extension.

11. The camera dolly of claim 9 with the axle having an annular shoulder on one side of the bearing and the knob unit having a handle on the other side thereof.

12. The camera dolly of claim 11 with the knob unit further comprising a tapered point and a threaded section.

13. The camera dolly of claim 1 wherein the low friction element is a linear ball bearing.

14. The camera dolly of claim 1 wherein the axle is positioned within the kingpin tube.

* * * * *